United States Patent [19]

Graves et al.

[11] Patent Number: 4,698,806

[45] Date of Patent: Oct. 6, 1987

[54] FRAME ALIGNMENT OF TRIBUTARIES OF A T.D.M. BIT STREAM

[75] Inventors: Alan F. Graves, Sherwood Park; Paul A. Littlewood, Edmonton, both of Canada

[73] Assignee: Northern Telecom Limited, Montreal, Canada

[21] Appl. No.: 821,931

[22] Filed: Jan. 24, 1986

[51] Int. Cl.$^4$ .................................................. H04J 3/06
[52] U.S. Cl. .................................................... 370/100
[58] Field of Search ........................ 370/100, 105, 106; 375/111, 118

[56] References Cited

U.S. PATENT DOCUMENTS

| | | | |
|---|---|---|---|
| 3,676,599 | 7/1972 | Heetman | 370/100 |
| 3,790,716 | 2/1974 | Herry et al. | 370/100 |
| 3,798,378 | 3/1974 | Epstein | 370/106 |
| 4,135,060 | 1/1979 | Heckel et al. | 370/105 |
| 4,531,210 | 7/1985 | Perry | 370/100 |

Primary Examiner—Douglas W. Olms
Assistant Examiner—Melvin Marcelo
Attorney, Agent, or Firm—R. John Haley

[57] ABSTRACT

A frame alignment method and apparatus are disclosed for aligning the t.d.m. frames of tributaries, each including channel bytes synchronously multiplexed with a frame synchronizing byte, which are byte-interleaved to form overall t.d.m. frames identified by a frame synchronizing word, the tributaries having arbitrary frame phases with respect to one another. A channel counter is reset in response to the frame synchronizing word, and for each tributary in response to the frame synchronizing byte the count of the channel counter is used to determine an offset value which is stored in a memory. Each byte of each tributary is stored in a RAM at an address determined by substracting the respective tributary offset from the current count of the channel counter, whereby the tributaries are stored in the RAM in a frame-aligned manner. Reading of the tributary bytes can be effected sequentially or via a connection memory providing a time switching function.

8 Claims, 6 Drawing Figures

FRAME ALIGNMENT OF TRIBUTARIES OF A T.D.M. BIT STREAM

This invention relates to the frame alignment of time division multiplexed (t.d.m.) bit streams.

In our copending U.S. patent application No. 797,264 filed on Nov. 12, 1985 and entitled "Method of Multiplexing Digital Signals" there is described a method of multiplexing digital signals synchronously so that individual channels are accessible in higher bit rate multiplexed signals. This considerably facilitates the handling and switching of such signals.

In an embodiment of the invention described in the above application, so-called tributary t.d.m. bit streams are provided, each tributary comprising 25 bytes or channels one of which serves as a synchronizing byte for the t.d.m. frames of the tributary, and 32 such tributaries are multiplexed together in a t.d.m. byte-interleaved manner to form a higher bit rate t.d.m. frame. The start of this higher bit rate t.d.m. frame is identified by one or more synchronizing words in a particular tributary which is referred to herein as a synchronizing tributary.

Such multiplexed tributaries can be conveniently switched in so-called digital cross-connect switches without demultiplexing the tributary frames, but this switching could result in different tributaries having different t.d.m. frame phases, or frame alignments, in the same higher bit rate multiplexed frame. This has been regarded as being impractical as requiring individual tributaries to be demultiplexed, synchronized so that they all have the same tributary frame alignment, and re-multiplexed prior to being supplied to a switching node for switching the individual channels. Conversely, the multiplexed tributaries incoming to each digital cross-connect could have their tributary frames aligned by respective frame aligners, but this would require the provision of frame aligners extensively throughout a switching network.

An object of this invention, therefore, is to provide a method and apparatus which obviate the need for the above-described demultiplexing and remultiplexing techniques without necessitating the provision of frame aligners throughout a network.

According to this invention there is provided a method of aligning t.d.m. frames of a plurality of byte-interleaved tributaries which are multiplexed together with arbitrary relative frame phases in t.d.m. frames each including a frame synchronizing word, each tributary including a frame synchronizing byte which includes frame synchronizing information for the tributary, comprising the steps of: for each tributary, determining an offset of the frame synchronizing byte of the tributary relative to the frame synchronizing word; and storing each byte of each tributary in a memory at an address determined by the position of the byte in the t.d.m. frame modified by the offset for the tributary; whereby the bytes can be read sequentially from the memory with the tributary t.d.m. frames aligned. The frame synchronizing information may comprise one or more bits of the frame synchronizing byte of each tributary.

Thus in accordance with this invention the incoming bytes of the tributaries are not stored sequentially in successive locations in the memory, as is the case for known frame aligners, but rather each byte is stored in a location determined by the position of the byte in the overall t.d.m. frame modified by an offset which has been determined for the tributary to which the byte belongs. In consequence, frame alignment of the tributaries is effected in the storage of the tributary bytes in the memory, without requiring any demultiplexing.

The determination of the offset for each tributary necessitates a knowledge of the position of the frame synchronizing byte of the tributary; this can be provided in various ways as described in greater detail in the detailed description below.

Preferably the step of determining the offset for each tributary comprises the steps of: counting bytes of the multiplexed tributaries; detecting the frame synchronizing word; resetting the count to a predetermined value in response to detection of the frame synchronizing word; and in response to the frame synchronizing byte of each tributary, storing a value which is dependent upon the current count and which represents the offset for the tributary; the method including the step of producing an address, for storage of each byte of each tributary in the memory, from the current count and the stored value representing the offset for the respective tributary.

An embodiment of the method of the invention includes the steps of: providing addresses for reading bytes sequentially from the memory; addressing a connection memory with said addresses to read out modified addresses from the connection memory and addressing the first mentioned memory with said modified addresses for reading bytes therefrom. In this manner the frame alignment function can also incorporate a time switching function.

The invention also provides frame alignment apparatus comprising: a random access memory for storing, at respective addresses, bytes of a t.d.m. frame of byte-interleaved tributaries, each tributary comprising a t.d.m. frame including a frame synchronizing byte having an arbitrary phase with respect to the other tributaries; counting means for counting bytes of the t.d.m. frame of byte-interleaved tributaries; means for detecting a frame synchronizing word of the t.d.m. frame of byte-interleaved tributaries and for resetting the counting means in response to such detection; memory means responsive to the frame synchronizing byte of each tributary for storing for the respective tributary a value which is dependent upon the current count of the counting means and which represents an offset of the respective frame synchronizing byte relative to the frame synchronizing word; and means for reading the respective stored value from the memory means and subtracting the corresponding offset from the current count of the counting means to provide an address for storage of each byte of each tributary in the random access memory; whereby the bytes of the tributaries are stored at successive addresses in the random access memory in a frame aligned manner.

The invention will be further understood from the following description with reference to the accompanying drawings, in which.

Figure 1:
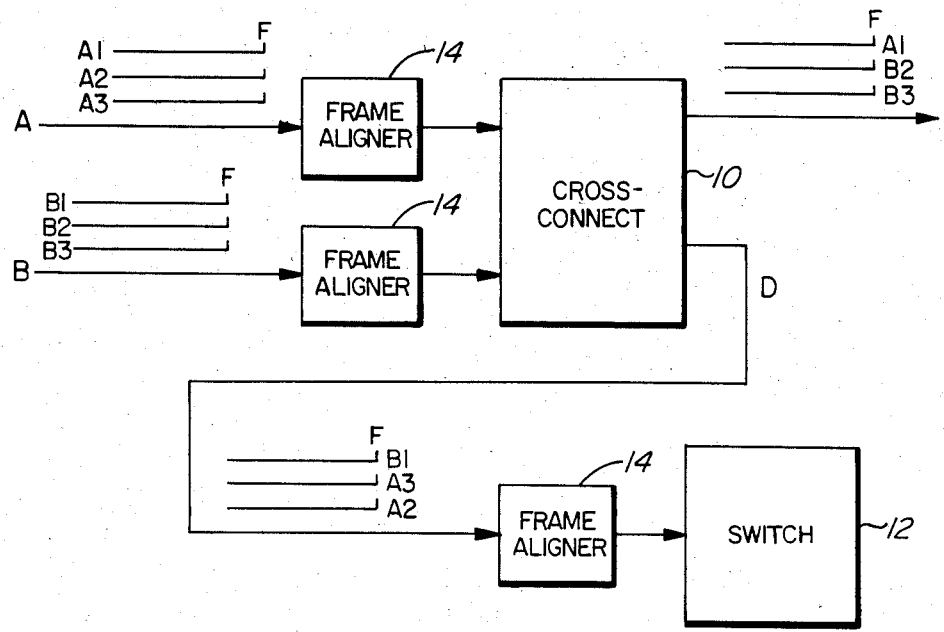
FIG. 1 is a schematic block diagram illustrating the switching of multiplexed signals through a switching network, maintaining frame alignment by using frame aligners throughout the network.
Figure 3:
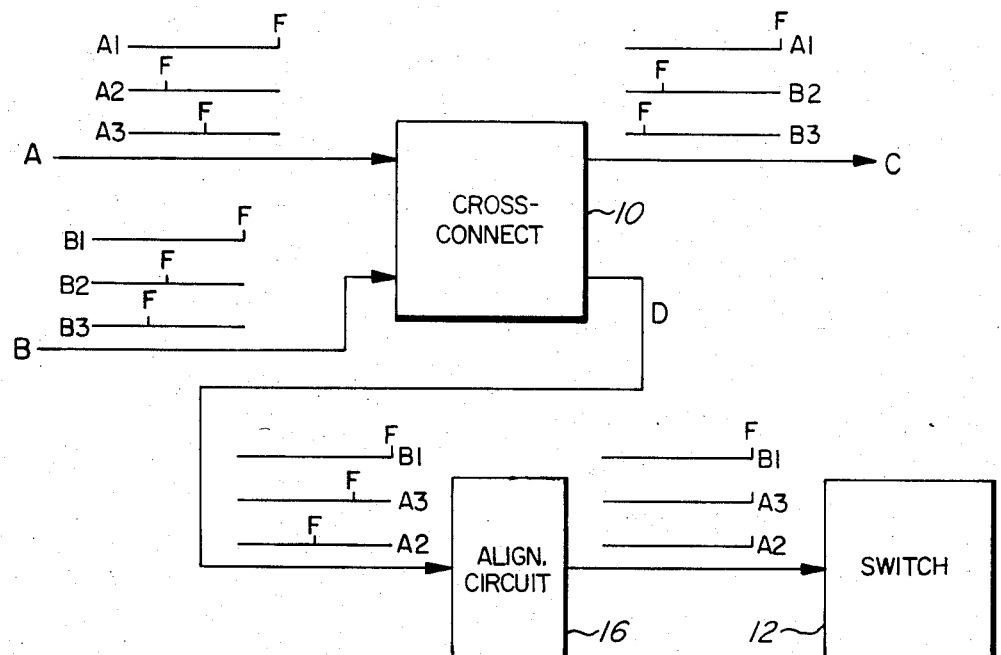
Figure 4:
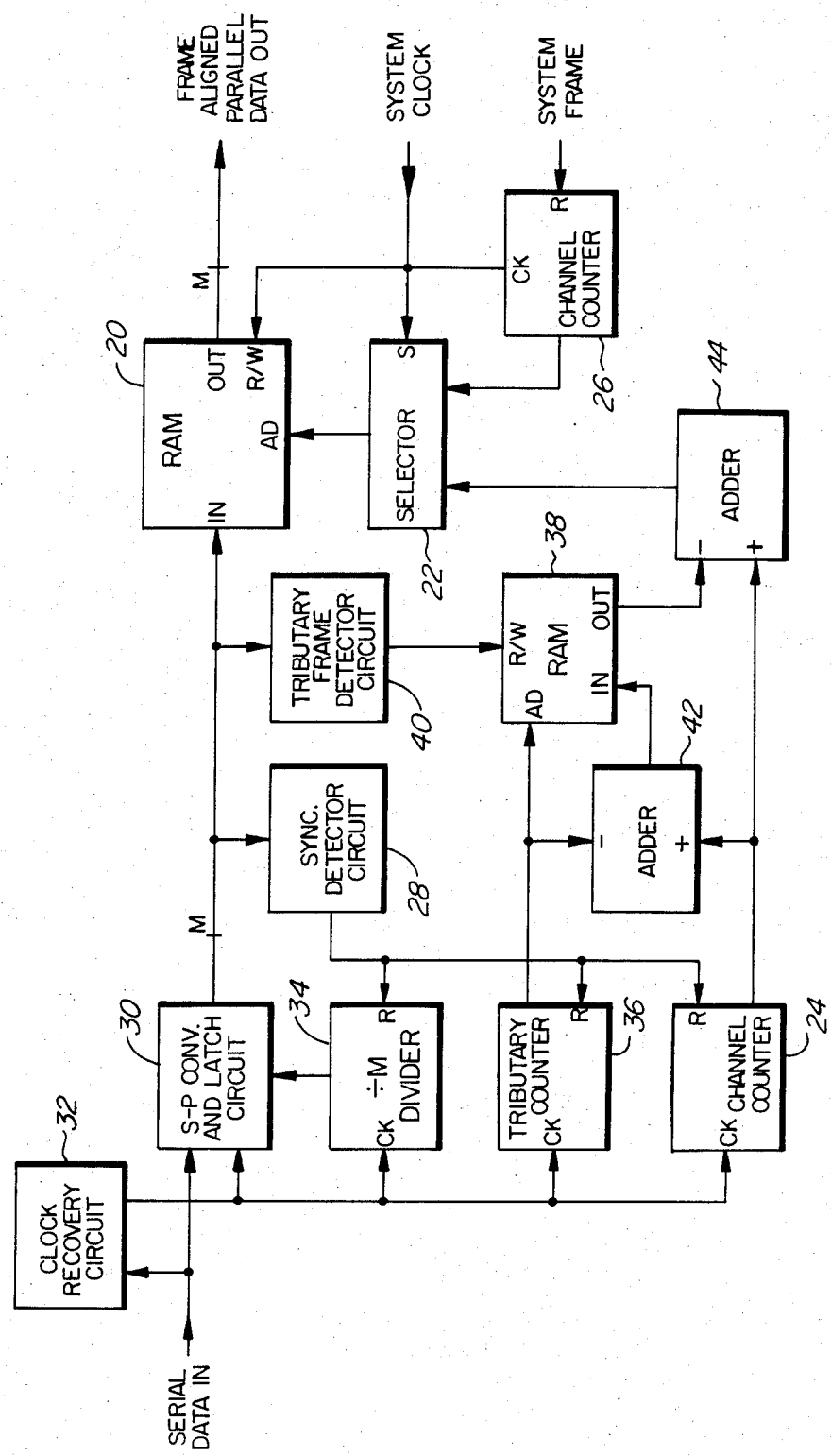
Figure 5:
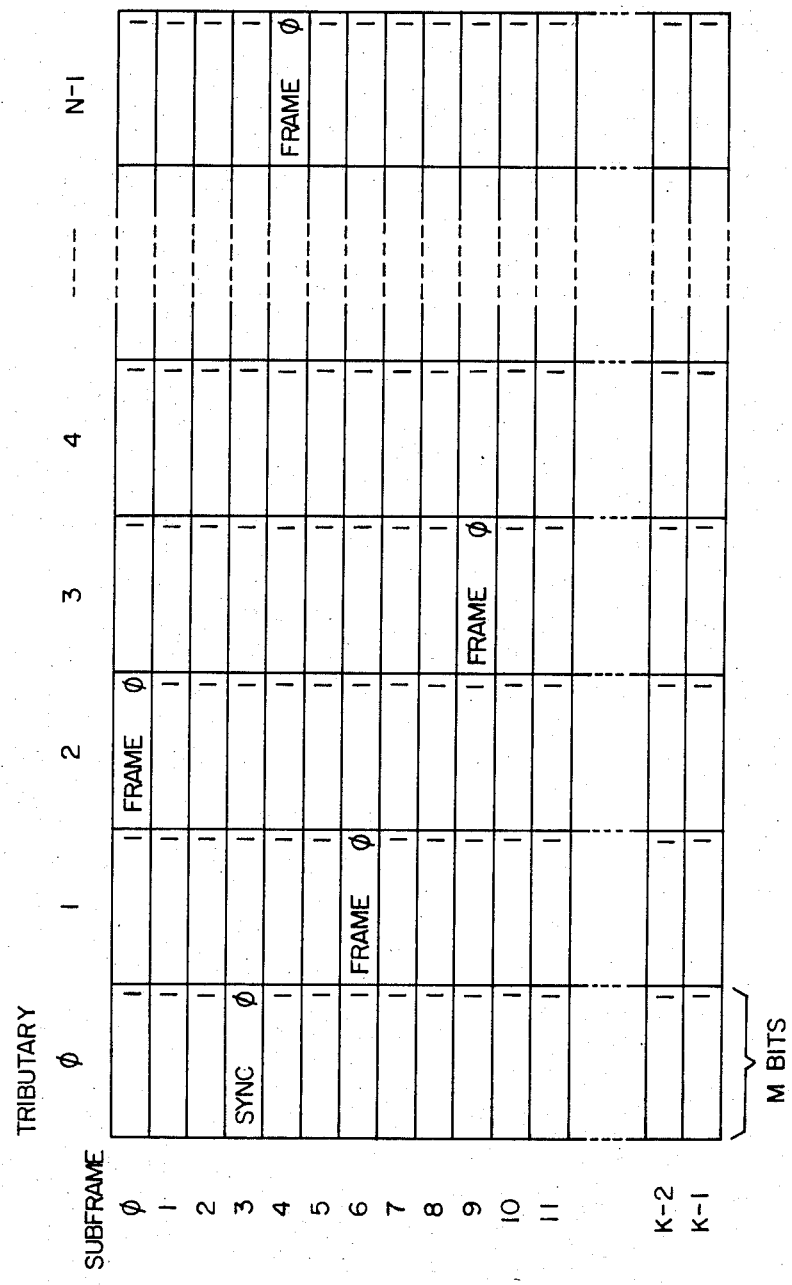
Figure 6:
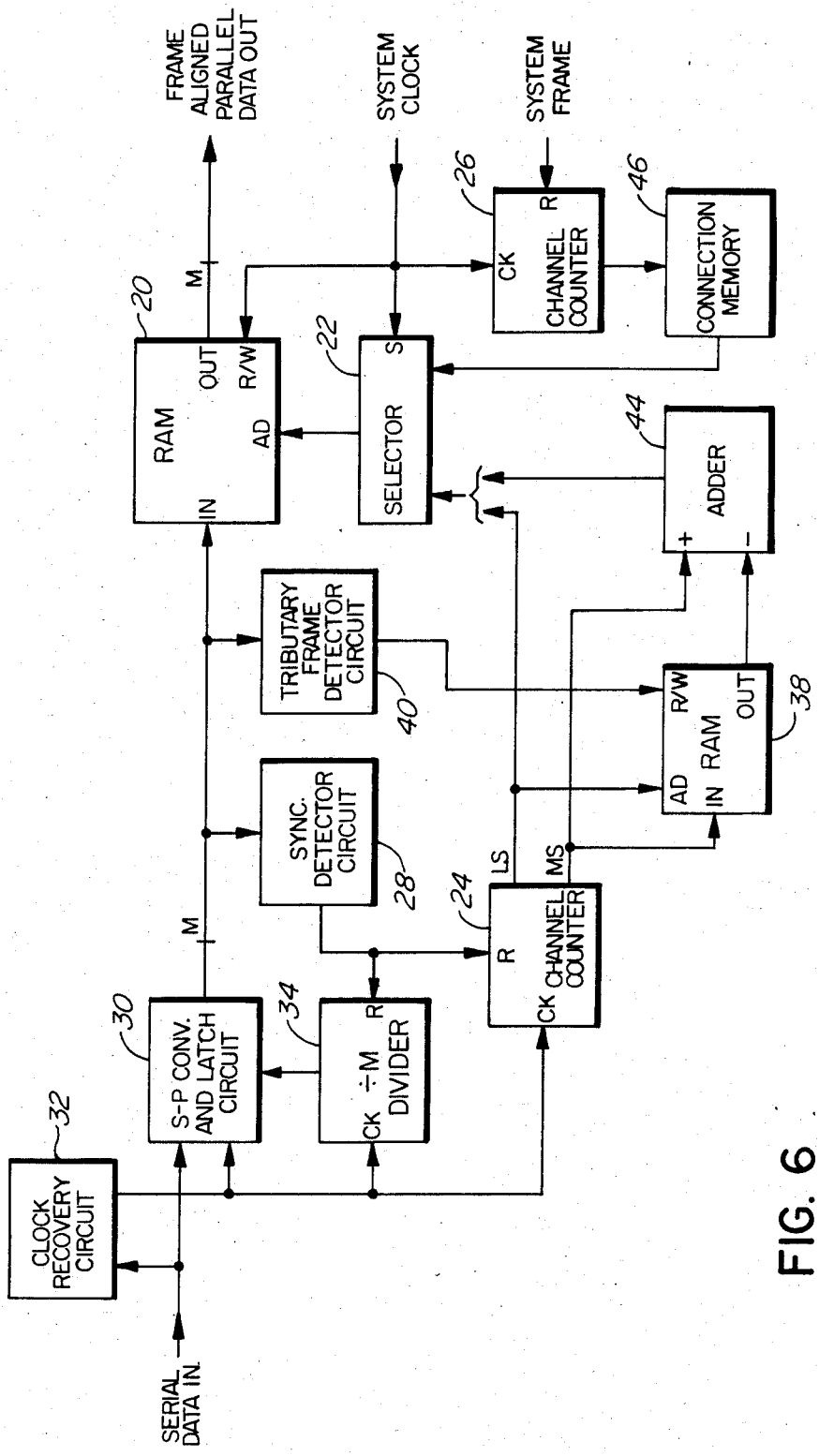

FIG. 3, which appears on the same sheet as FIG. 1, is a schematic block diagram illustrating the switching of multiplexed signals through a switching network without maintaining frame alignment;

FIG. 4 is a schematic block diagram illustrating frame alignment apparatus in accordance with an embodiment of this invention; and FIG. 5 illustrates a frame of a t.d.m. signal which may be supplied to the apparatus of FIG. 4; and FIG. 6 is a schematic block diagram illustrating frame alignment apparatus in accordance with another embodiment of the invention.

Referring to FIG. 1, parts of a digital signal network including a so-called digital cross-connect 10, a switch 12, and frame aligners 14 are shown arranged in a manner known from the prior art. Only those parts of the network necessary for a clear understanding of this invention are shown, and these parts are shown in a greatly simplified manner for clarity.

The digital cross-connect 10 serves to switch t.d.m. signals, for example at the so-called DS-1 level, between respective time channels on incoming and outgoing higher bit rate lines. For example, FIG. 1 illustrates high bit rate lines A and B incoming to the cross-connect 10 and high bit rate lines C and D outgoing therefrom. The line A carries multiplexed tributaries A1, A2, and A3, represented schematically in FIG. 1, at the DS-1 level, each tributary containing its own t.d.m. frames of multiplexed lower bit rate (DS-0) signals together with frame synchronizing information the timing of which is represented schematically in FIG. 1 by a vertical mark and an adjacent letter F.

Similarly, the line B carries tributaries B1, B2, and B3. The tributaries A1 to A3 and B1 to B3 are switched by the cross-connect 10 so that, as illustrated by way of example in FIG. 1, the outgoing line C carries the tributaries A1, B2, and B3 and the outgoing line D carries the tributaries B1, A3, and A2. These latter tributaries on the line D are supplied to the switch 12 for switching of their DS-0 channels.

In the network of FIG. 1, frame alignment among the various tributaries on each line is maintained throughout the network. Thus on the line A the frame synchronizing information F of all of the tributaries A1 to A3 is aligned, i.e. occurs at substantially the same time. The same applies for each of the lines B, C, and D. This frame alignment is maintained by providing, for each line incoming to a cross-connect 10 or switch 12, a respective frame aligner 14 which serves to align the framing of the tributaries on the line to the system framing of the cross-connect 10 or switch 12.

Figure 2:
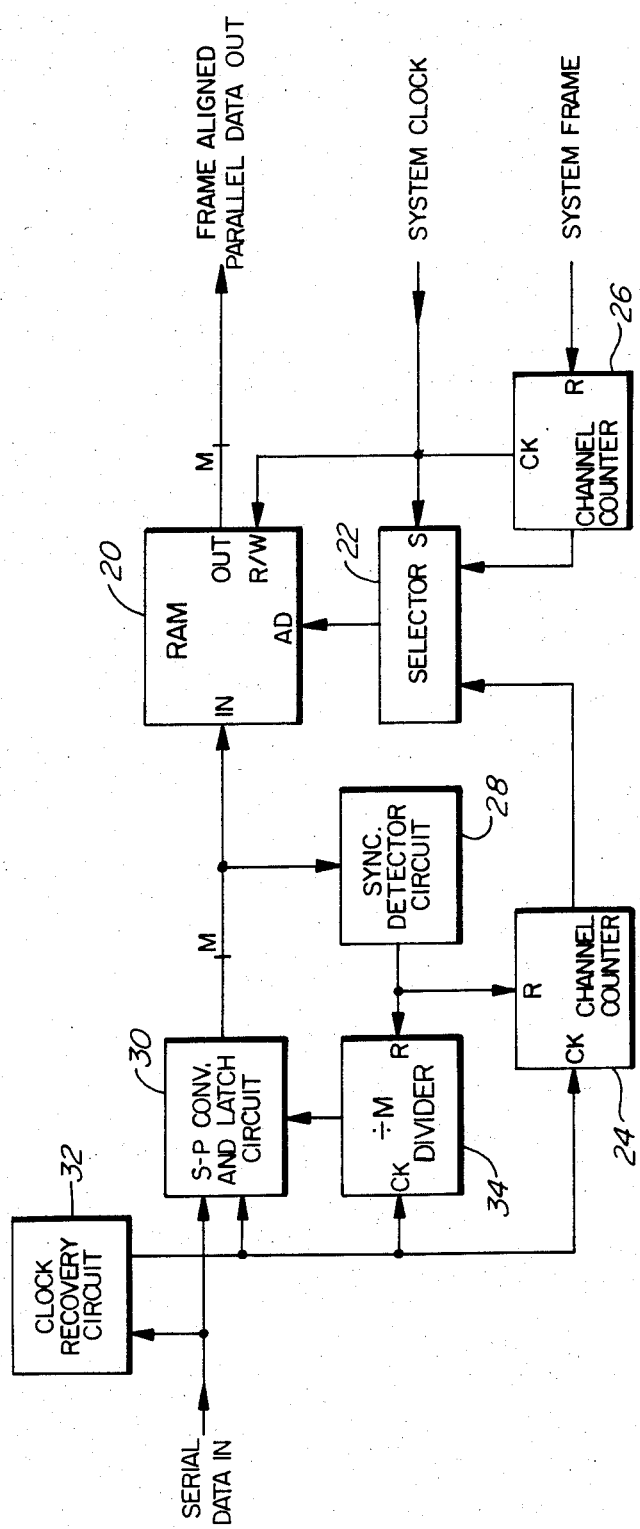
FIG. 2 illustrates a known form of frame aligner.

FIG. 2 illustrates a known form of frame aligner, which may be used in the network of FIG. 1 and which comprises a RAM (random access memory) 20 having a data input, data output, address input AD, and a read-/write control input R/W, an address selector 22 having a control input S, write and read channel counters 24 and 26 each having a clock input CK and a resetting input R, and a synchronizing detector circuit 28. The incoming serial data from the respective high bit rate line, comprising the aligned tributaries, is supplied to a serial-to-parallel converter and latch circuit 30, where it is converted into words each of M bits in parallel which are applied to the data input of the RAM 20 and to the circuit 28. The incoming serial data is also supplied to a clock recovery circuit 32, which supplies a recovered clock signal to the circuit 30, to a ÷M divider 34 whose output controls the latch of the circuit 30, and to the clock input CK of the write channel counter 24. The circuit 28 detects the frame synchronizing information F in known manner and resets the divider 34 and the write channel counter 24 to zero accordingly. The read channel counter 26 is reset to zero by system frame information supplied by the respective cross-connect 10 or switch 12, which also supplies a system clock which increments the read channel counter 26 and controls the selector 22 and the input R/W of the RAM 20. Writing 30 of data into the RAM 20 is effected at an address supplied via the selector 22 by the write channel counter 24, which is incremented by the recovered clock signal, and reading of data from the RAM 20 is effected at an address supplied via the selector 22 by the read channel counter 26.

The network of FIG. 1 has the serious disadvantage of requiring the use of a frame aligner, for example as shown in FIG. 2, for each line incoming to a cross-connect or switch.

It has been recognized, however, that the maintenance of frame alignment throughout a network is not essential, and that frame alignment is only really required prior to those switches, such as the switch 12, which operate to switch the lower (DS-0) bit rate channels. Accordingly FIG. 3, in which the same references as in FIG. 1 are used to denote similar elements, shows a network in which frame alignment of the tributaries is not maintained, but is restored for the line D prior to the switch 12.

Thus in FIG. 3 the frame aligners 14 are dispensed with, the tributaries on each line A, B, C, or D having arbitrary relative frame timings as illustrated. The cross-connect 10 does not switch the low bit rate DS-0 channels individually and so no frame alignment circuitry is required prior to this unit. The switch 12 switches DS-0 channels and accordingly is preceded on the line D by an alignment circuit 16, which is required to align the frame of each tributary B1, A3, and A2 on the line D from its arbitrary timing to the system timing of the switch 12.

Hitherto, a network such as that shown in FIG. 3 has been considered to be impractical because of the arrangement which has been required to implement the alignment circuit 16. More particularly, it has been necessary to implement this circuit 16 as a demultiplexer for demultiplexing the incoming high bit rate signal into its individual tributaries, a set of frame aligners, one for each tributary, each for aligning the frame of that tributary to the system frame of the switch 12 in the manner described above in relation to FIG. 2, and a multiplexer for recombining the aligned tributaries for supply to the switch 12.

The invention enables the provision of a greatly simplified form of alignment circuit 16 than that just described, which renders the network arrangement of FIG. 3 to be implemented in a practical manner. Thus the need for large numbers of frame aligners in the network of FIG. 1, or in the alignment circuit 16 in the prior art in the network of FIG. 3, is dispensed with by the present invention.

An embodiment of a frame alignment circuit in accordance with the invention, which may be used to implement the alignment circuit 16 in the network of FIG. 3, is illustrated in FIG. 4, in which components similar to those of the known form of frame aligner described above with reference to FIG. 2 are used and denoted by the same references. In addition, the circuit of FIG. 4 includes a tributary counter 36, a RAM 38, a tributary frame detector circuit 40 and two adders 42 and 44 each of which operates in a subtraction mode as indicated by its inputs referenced + and −.

The tributary frame detector circuit 40 is responsive to the data supplied from the circuit 30 to supply to a read/write control input R/W of the RAM 38 a frame marker signal which has a first state, for example a binary 0, which enables writing of data into the RAM 38 at the frame synchronizing time F for each tributary, and has a second state, for example a binary 1, which enables reading of data from the RAM 38 at all other times. The RAM 38 is addressed via an address input AD by the output of the tributary counter 36, which like the channel counter 24 is reset to zero by the output of the synchronizing detector circuit 28 and is incremented by the recovered clock signal. The tributary counter 36 is a modulo-N counter, where N is the number of tributaries in the incoming data.

The adder 44 is interposed in the path between the output of the channel counter 24 and the respective input of the selector 22, and has its subtractive input connected to the data output of the RAM 38. The data input of the RAM 38 is taken from the output of the adder 42, which subtracts the output of the tributary counter 36 from the output of the channel counter 24.

The operation of the frame alignment circuit of FIG. 4 is described below with additional reference to FIG. 5, which illustrates one possible form of a frame of input data and with reference to which one possible way of deriving the frame marker signal is explained. This form of t.d.m. frame is described in greater detail in our copending patent application entitled "Method of Multiplexing Digital Signals" already referred to.

Referring to FIG. 5, the t.d.m. frame illustrated therein, in which N multiplexed tributaries 0 to N-1 are carried on a high bit rate line without frame alignment in the manner indicated in FIG. 3, comprises K subframes, numbered 0 to K-1 and shown one below another for clarity and convenience, each sub-frame accommodating one M-bit word in turn of each tributary. Each tributary includes in each frame one word which corresponds to the frame synchronizing information for the t.d.m. frame of the respective tributary. For the tributaries 1 to N-1 in FIG. 5, this is identified by the word FRAME, and for the tributary 0 this is identified by the different word SYNC; this distinction enables the tributary 0, and hence all of the other tributaries, to be uniquely identified. As indicated in FIG. 5, these frame synchronizing information words occur at arbitrary positions within the overall frame, showing that there is no frame alignment among the tributaries of the incoming data.

As illustrated in FIG. 5, one bit in each word of each tributary is provided with a binary 0 value to identify the timing of the frame synchronizing information for the tributary, and a binary 1 value at other times. This bit can be used directly as the frame marker signal, as is assumed here for clarity and convenience of description, whereby the tributary frame detector circuit 40 is replaced by a direct connection between the relevant bit output of the circuit 30 and the R/W input of the RAM 38. However, as explained in the copending patent application referred to above, this bit is desirably used for other purposes as well, in which case the circuit 40 is provided to produce the frame marker signal. Furthermore, the frame marker signal could instead be derived by the circuit 40 directly from the SYNC and FRAME information in the tributaries, using known frame finding techniques.

The synchronizing detector circuit 28 in FIG. 4 detects the word SYNC in tributary 0, and upon such detection resets the counters 24 and 36 to zero. At this time the frame marker signal at the output of the circuit 40 is 0, so that the RAM 38 is enabled for writing, and at an address 0, identifying this tributary and provided by the tributary counter 36, an offset of zero, equal to the channel count of 0 provided by the channel counter 24 minus the tributary count of 0 is determined by the adder 42 and is stored in the RAM 38. This offset is read out from the RAM 38 and subtracted by the adder 44 from the channel count, so that an address of zero is supplied to the RAM 20 so that this word SYNC is stored in the RAM 20 at location zero. Similarly, for the other 24 words in the tributary 0 this zero offset read out from the RAM 38 has no effect in the adder 44, so that these words are stored in turn in locations of the RAM 20 identified by the channel counter 24, namely locations N, 2N, 3N, and so on.

For the tributary 1, as shown in FIG. 5 the frame word occurs in the arbitrary sub-frame 6, at which time the frame marker signal is 0 to enable writing into the RAM 38 at an address 1 provided by the tributary counter 36 and identifying this tributary. At this time the channel counter 24 has a count of $3N+1$, representing that 3 sub-frames each of N words, and one more word, have occurred from the time of the tributary 0 SYNC word to the present time. This channel count of $3N+1$ is reduced in the adder 42 by the count of the tributary counter 36, i.e. by 1 to 3N, and the resultant offset is stored in the RAM 38.

For each word of the tributary 1, the offset of 3N stored in the RAM 38 is read out and subtracted in the adder 44 from the current channel count provided by the counter 24, the resultant count being used as an address for the RAM 20. In consequence, the FRAME word of the tributary 1 is stored in location 1 of the RAM 20, and the words of tributary 1 occurring in the subsequent sub-frames 7, 8, 9, and so on are stored in locations $N+1$, $2N+1$, $3N+1$, and so on of the RAM 20. It can thus be seen that the words of tributary 1 are stored in the RAM 20 in frame alignment with those of the tributary 0.

The same applies to, and is achieved in the same manner for, each of the other tributaries 2 to N-1. Reading of the data from the RAM 20 is effected in the same manner as in the prior art, with the tributary frames aligned with the system frame as illustrated in FIG. 3 between the units 16 and 12.

From the foregoing description it should be appreciated that the circuit of FIG. 4 aligns the tributary 0 to the system frame by the resetting of the counter 24, and aligns each other tributary correspondingly by storing an offset of the tributary frame timing relative to that of the tributary 0, and modifying the storage address for the tributary's words in the RAM 20 in dependence upon this offset. This is accomplished by relatively simple additions, specifically the units 36 to 44, to known frame aligner circuitry.

It should be further appreciated that the additional circuitry provided in accordance with the above described embodiment of the invention is applied only to the "write" side of the frame aligner. The "read" side of the frame aligner could instead be modified in a converse manner to achieve a similar result. More significantly, however, as shown in FIG. 6 the "read" side of the frame aligner could be modified by providing a time switch connection memory 46, controlled in known manner by the system via connections which are not shown, between the read channel counter 26 and the respective input of the selector 22, the output of the counter 26 being used to address the connection memory 46 to read out a connection address for addressing the RAM 20 via the selector 22, resulting in a combined frame aligner and time switch.

The additions required to the "write" side of the frame aligner can be further simplified in the event that the number N of tributaries is an integral power of 2, as would normally be the case for convenience. In this case, as also shown in FIG. 6, the tributary counter 36 and the adder 42 can be dispensed with.

More particularly, in FIG. 6, in which the same references as in FIG. 4 are used to denote similar components, the channel counter 24 has its output separated into least significant (LS) and most significant (MS) bit positions, the former being connected to the address input AD of the RAM 38 and to respective bit positions of the respective input of the selector 22, and the latter being connected to the data input of the RAM 38 and to the + input of the adder 44. The adder 44 has its —input connected to the data output of the RAM 38 and its output connected to the most significant bit positions of the respective input of the selector 22.

In the above manner, the least significant bit positions of the channel counter 24 serve the function of the tributrary counter 36, and only the most significant bits are processed by the RAM 38 and adder 44 whereby the adder 42 is not required. For example, there may conveniently be N=32 tributaries and K=25 subframes, the channel counter 24 having KN=800 counting states and 10 outputs divided between 5 LS and 5 MS outputs connected as shown in FIG. 6.

Numerous modifications, variations, and adaptations may be made to the embodiments of the invention described above without departing from the scope of the invention as defined in the claims.

What is claimed is:

1. A method of aligning t.d.m. frames of a plurality of byte-interleaved tributaries which are multiplexed together with arbitrary relative frame phases in t.d.m. frames each including a frame synchronizing word, each tributary including a frame synchronizing byte which includes frame synchronizing information for the tributary, comprising the steps of:
   for each tributary, determining an offset of the frame synchronizing byte of the tributary relative to the frame synchronizing word; and
   storing each byte of each tributary in a memory at an address determined by the position of the byte in the t.d.m. frame modified by the offset for the tributary;
   whereby the bytes can be read sequentially from the memory with the tributary t.d.m. frames aligned.

2. A method as claimed in claim 1 wherein the step of determining the offset for each tributary comprises the steps of:
   counting bytes of the multiplexed tributaries;
   detecting the frame synchronizing word;
   resetting the count to a predetermined value in response to detection of the frame synchronizing word; and
   in response to the frame synchronizing byte of each tributary, storing a value which is dependent upon the current count and which represents the offset for the tributary;
   the method including the step of producing an address, for storage of each byte of each tributary in the memory, from the current count and the stored value representing the offset for the respective tributary.

3. A method as claimed in claim 2 wherein the step of producing the address for storage of each byte of each tributary comprises the step of subtracting the offset represented by the stored value for the respective tributary from the current count to produce said address.

4. A method as claimed in claim 1 and including the steps of:
   providing addresses for reading bytes sequentially from the memory;
   addressing a connection memory with said addresses to read out modified addresses from the connection memory; and
   addressing the first mentioned memory with said modified addresses for reading bytes therefrom.

5. Frame alignment apparatus comprising:
   a random access memory for storing, at respective addresses, bytes of a t.d.m. frame of byte-interleaved tributaries, each tributary comprising a t.d.m. frame including a frame synchronizing byte having an arbitrary phase with respect to the other tributaries;
   counting means for counting bytes of the t.d.m. frame of byte-interleaved tributaries;
   means for detecting a frame synchronizing word of the t.d.m. frame of byte-interleaved tributaries and for resetting the counting means in response to such detection;
   memory means responsive to the frame synchronizing byte of each tributary for storing for the respective tributary a value which is dependent upon the current count of the counting means and which represents an offset of the respective frame synchronizing byte relative to the frame synchronizing word; and
   means for reading the respective stored value from the memory means and subtracting the corresponding offset from the current count of the counting means to provide an address for each byte of each tributary in the random access memory.

6. Apparatus as claimed in claim 5 and including:
   means for providing sequential addresses; and
   memory means responsive to said sequential addresses for supplying modified addresses for addressing the random access memory for reading bytes of said tributaries therefrom.

7. Apparatus as claimed in claim 5 wherein the means for reading and subtracting provides an address for storage of each byte of each tributary in the randon access memory, whereby the bytes of the tributaries are stored at successive addresses in the random access memory in a frame aligned manner.

8. A method of aligning t.d.m. frames of a plurality of byte-interleaved tributaries which are multiplexed together with arbitrary relative frame phases in t.d.m. frames each including a frame synchronizing word, each tributary including a frame synchronizing byte which includes frame synchronizing information for the tributary, comprising the steps of:
   for each tributary, determining an offset of the frame synchronizing byte of the tributary relative to the frame synchronizing word;
   storing each byte of each tributary in a memory; and
   reading the bytes from the memory with the tributary t.d.m. frames aligned;
   wherein one of the storing and reading steps is effected sequentially for the respective bytes and the other of the storing and reading steps is effected for each byte at an address determined by the position of the byte in the t.d.m. frame modified by the offset for the tributary.

* * * * *